March 25, 1930.                A. C. GETZ                1,752,249
                    CHANGE SPEED GEARING FOR LATHE HEADS
                  Original Filed Oct. 28, 1926    6 Sheets-Sheet 1

WITNESSES

*Alfred C. Getz*
INVENTOR

BY

ATTORNEY

March 25, 1930.  A. C. GETZ  1,752,249
CHANGE SPEED GEARING FOR LATHE HEADS
Original Filed Oct. 28, 1926  6 Sheets-Sheet 2

Alfred C. Getz
INVENTOR

BY  E. G. Siggers
ATTORNEY

WITNESSES
C. L. McDonald
E. N. Loverell

March 25, 1930.  A. C. GETZ  1,752,249
CHANGE SPEED GEARING FOR LATHE HEADS
Original Filed Oct. 28, 1926   6 Sheets-Sheet 4

WITNESSES
C. L. McDonald
E. N. Loverell

Alfred C. Getz
INVENTOR

BY
ATTORNEY

March 25, 1930.  A. C. GETZ  1,752,249
CHANGE SPEED GEARING FOR LATHE HEADS
Original Filed Oct. 28, 1926    6 Sheets-Sheet 5
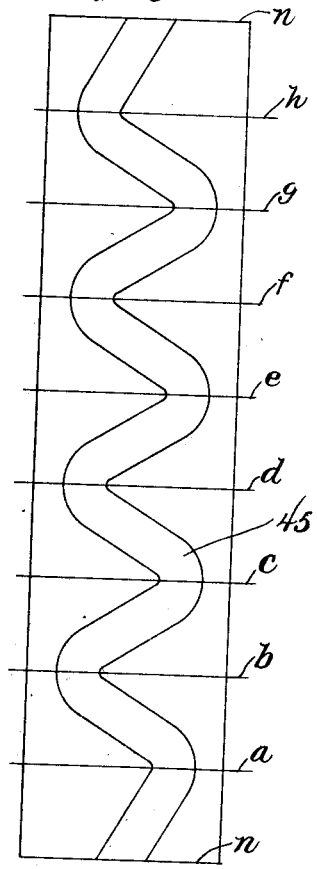
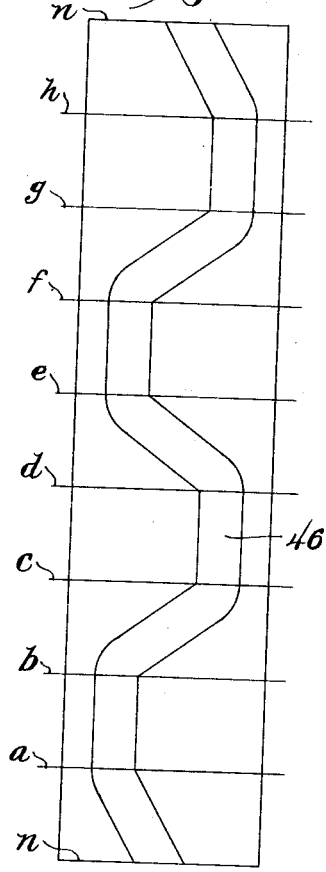
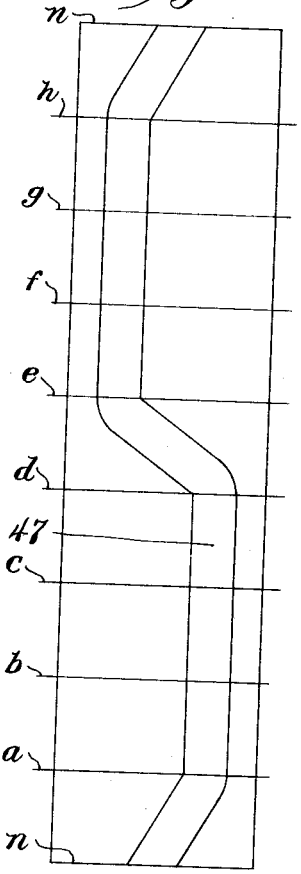
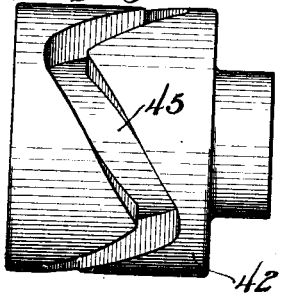
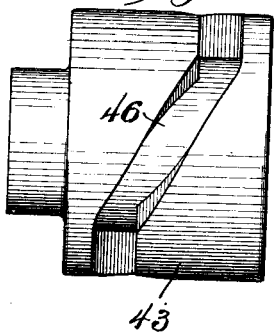
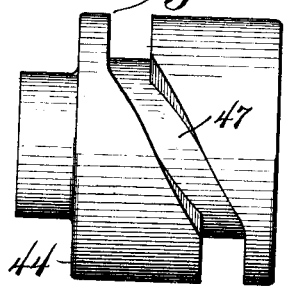
Alfred C. Getz
INVENTOR
ATTORNEY March 25, 1930.    A. C. GETZ    1,752,249
CHANGE SPEED GEARING FOR LATHE HEADS
Original Filed Oct. 28, 1926    6 Sheets-Sheet 6

WITNESSES
C. L. McDonald
E. N. Lovewell

Alfred C. Getz
INVENTOR
BY
ATTORNEY

Patented Mar. 25, 1930

1,752,249

UNITED STATES PATENT OFFICE

ALFRED C. GETZ, OF SIDNEY, OHIO

CHANGE-SPEED GEARING FOR LATHE HEADS

Application filed October 28, 1926, Serial No. 144,779. Renewed March 15, 1929.

This invention relates to change speed gearing for lathe heads and the like and, among other objects, aims to provide an improved and simplified arrangement of gears and mechanism for selectively shifting the same, so that a considerable variety of speeds may be obtained by manipulating a single lever or handle.

In the drawings wherein one embodiment of the invention is illustrated.

Figures 7, 8 and 9 are detached plan views of the several cams used in the selecting mechanism.

Figures 10, 11 and 12 are diagrammatic views illustrating the shape of the cam grooves shown in Figures 7, 8 and 9 respectively.

Figure 1:
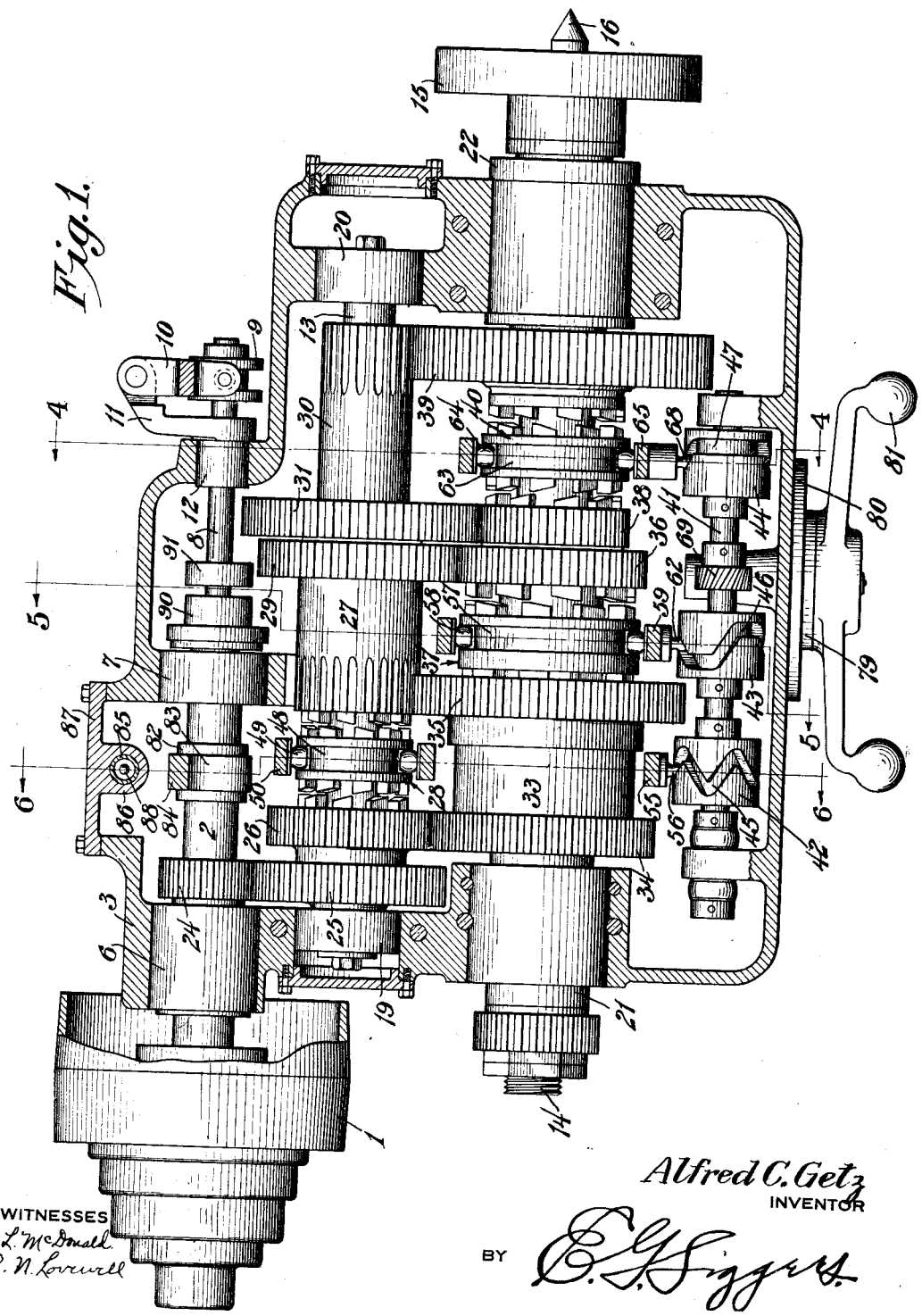
Figure 1 is a horizontal section through the head stock housing of a lathe embodying the improvements.

As shown in the drawings, the lathe is driven through the medium of a pulley 1, which has the usual clutch connection with a drive shaft 2 mounted in the gearing housing 3. The drive shaft 2 is preferably supported for rotation in ball bearings 4 and 5, which are held within bearing sleeves 6 and 7 respectively, suitably secured within the housing. A clutch control rod 8 is slidably mounted centrally of the drive shaft 2, and has a spool 9 secured to one end thereof, and engaged by a shifting fork 10 mounted for rocking movement in a fulcrum bracket 11, which is formed with a boss 12 secured in the housing 3, and acting as a bearing for the rod 8. Through mechanism hereinafter described, the drive shaft 2 is adapted to drive an intermediate shaft 13, mounted within the housing 3, and this intermediate shaft drives the spindle 14, which has a dog plate 15 secured to the outer end and centre 16 secured to its inner end.

The intermediate shaft 13 is rotatably supported in ball bearings 17 and 18, which are held within sleeves 19 and 20 respectively, secured within the housing 3. The spindle 14 is supported for rotation in bearings 21 and 22 respectively, mounted in the walls of the gear housing, and the usual thrust ball bearing 23 is provided for taking up the endwise thrust of the spindle.

The driving connection between the drive shaft 2 and the intermediate shaft 13 consists of a pinion 24, secured to the shaft 2, and in mesh with a gear 25 secured to the shaft 13. A gear 26 is supported on the shaft 13 adjacent the gear 25, and is rotatable thereon, but held by any suitable means against longitudinal movement. Spaced from the gear 26 is a sleeve 27, which is also rotatable on the shaft 13, but held against endwise movement. A double-faced clutch 28 is keyed to the shaft 13 between the gear 26 and the end of the sleeve 27, and is adapted to be shifted in one direction to lock the gear 26 to the shaft, and in the other direction to lock the sleeve 27 to the shaft. The sleeve 27 is formed with gear teeth at one end, and at the other end has a gear 29 secured thereon. Adjacent the gear 29, another sleeve 30 is rotatably mounted on the shaft 13, and is formed with gear teeth at one end, and has a gear 31 secured to its other end.

A sleeve 32 is rotatably mounted on the spindle 14, and a hub 33 is rotatably mounted on one end of this sleeve. Spaced gears 34 and 35 are secured to the hub 33, the gear 34 being in constant mesh with the gear 26, and the gear 35 being in constant mesh with the teeth on the sleeve 27. A gear 36 is rotatably mounted on the sleeve 32, and is in constant mesh with the gear 29. A double-faced clutch 37 is keyed to the sleeve 32 between the gears 35 and 36, and may be shifted in one direction to lock the gear 35 to the sleeve 32, and shifted in the other direction to lock the gear 36 to the sleeve 32. The sleeve 32 is formed with a gear 38 on the end adjacent the gear 36, the gear 38 being in constant mesh with the gear 31. A gear 39 is rotatably mounted on the spindle 14, and spaced from the gear 38. This gear 39 is in constant mesh with the teeth on the sleeve 30. A double-faced clutch 40 is keyed to the spindle 14 between the gear 38 and gear 39, and may be moved in one direction to lock the gear 38 to the spindle, or moved in the other direction to lock the gear 39 to the spindle.

Figure 4:
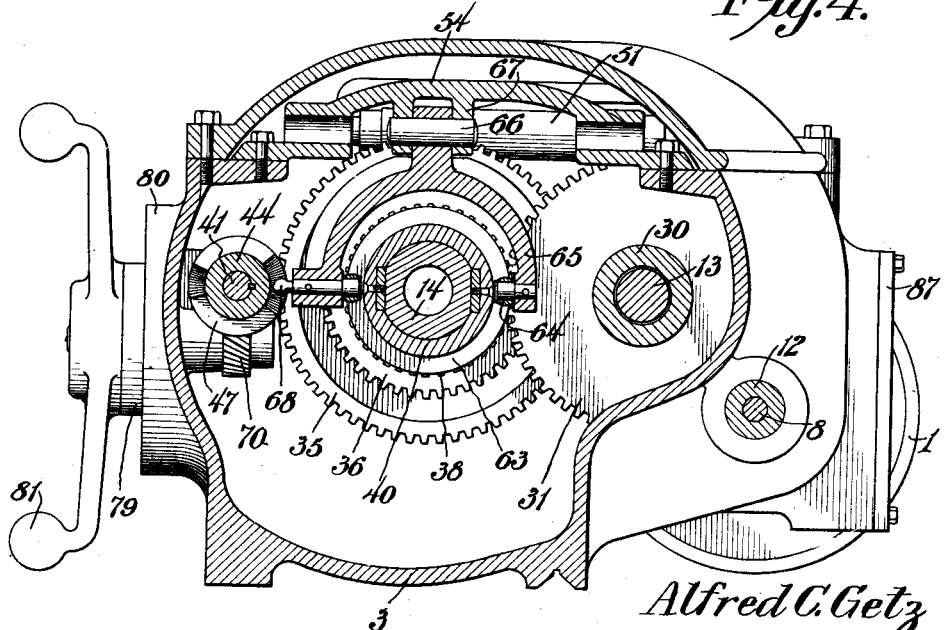
Figure 4 is a vertical section taken on the line 4—4 of Figure 1.
Figure 5:
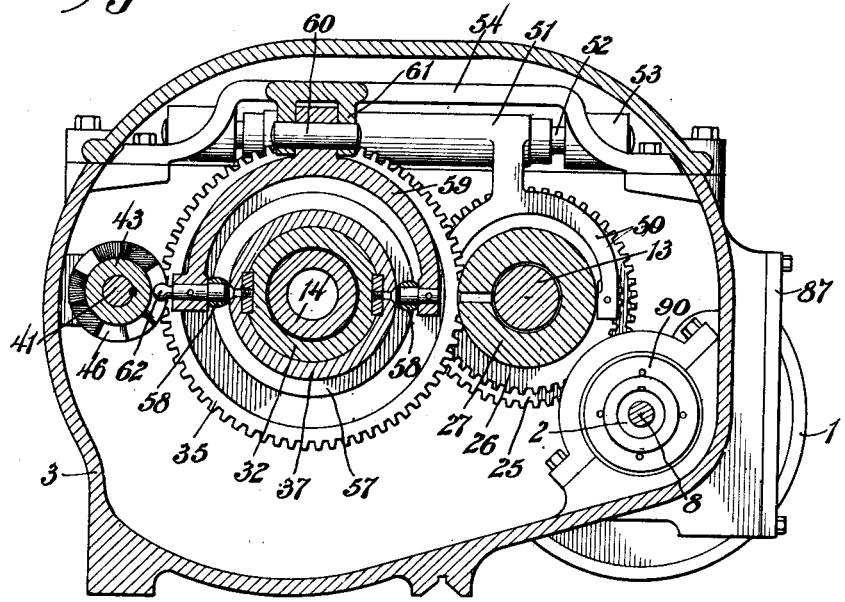
Figure 5 is a vertical section taken on the line 5—5 of Figure 1.

For controlling the positions of the clutches 28, 37 and 40, a cam shaft 41 is rotatably mounted in the front part of the housing 3, and secured on this shaft are cams 42, 43 and 44, provided respectively with peripheral grooves 45, 46 and 47. The clutch 28 is provided with a circumferential channel 48, which receives pins 49 projecting inwardly from a yoke 50, projecting downwardly from a sleeve 51. The sleeve 51 is journaled on a shaft 52, which is secured in sockets 53 formed in a spider 54, removably secured in the upper part of the housing 3 under the cover (Fig. 4). The front end of the sleeve 51 has an arm 55, which projects downwardly and carries a pin 56, which engages the cam groove 45. It will be seen, therefore, that as the shaft 41 rotates with the cam 42, the clutch 28 is shifted back and forth, according to the direction of the cam groove 45.

For shifting the clutch 37, the latter is formed with a circumferential channel 57, which receives pins 58 secured in the ends of a yoke 59 journaled on a pin 60, secured in ears 61 formed on the bracket 54. The pin 58 which is carried by the front arm of the yoke 59, is extended forwardly, as at 62 and engages the groove 46 in the cam 43. Thus, rotational movement of the cam 43 with the shaft 41 serves to shift the clutch 37, in accordance with the shape of the cam groove 46.

For shifting the clutch 40, the latter is provided with a circumferential channel 63, which is engaged by pins 64 carried by a yoke 65, journaled on a pin 66 secured in ears 67 depending from the bracket 54. The pin 64 which is secured in the front arm of the yoke 65 is extended forwardly, as at 68, to engage the cam groove 47. Thus, when the cam 44 rotates with the shaft 41, the clutch 40 is shifted in accordance with the shape of the groove 47.

All of the clutch yokes are pivoted to and suspended from the spider 54 and may be lifted out of their clutch grooves with the spider. This arrangement not only facilitates quick and easy assembly of the yokes but enables the whole yoke assembly to be removed very quickly to afford access to the gearing for repairs or adjustments.

Any suitable means may be provided for rotating the cam shaft 41, and for determining its position. The means herein shown comprises a spiral gear 69 secured to the shaft 41, and meshing with a spiral gear 70 secured on a shaft 71, which is journaled in the front wall of the housing. The front part of the shaft 71 is formed with a head 72, having a hub 73 keyed thereon. The inner end of this hub is formed with a peripheral flange 74, which extends underneath a rim 75, which is secured to the housing. The hub 73 is urged outwardly by a coiled spring 76 surrounding the head 72. A pin 77 is secured in the rim 75, and is adapted to register with holes 78 in the flange 74, whenever the shaft 71 is turned to any one of a number of predetermined positions. A dial 79 is secured to the hub 73 covering the rim 75, and fitting within an annular flange 80 formed on the housing. Certain indicia are placed on the dial 79, and in connection with a mark on the flange 80 serve to indicate definitely the position of the shaft 71, and the speed ratio which will be obtained due to the resulting position of the various cams 42, 43 and 44, and the corresponding positions of the clutches 28, 37 and 40. A handle 81, or other convenient means, may be secured to the dial 79 to rotate the same, together with the shaft 71.

Figure 2:
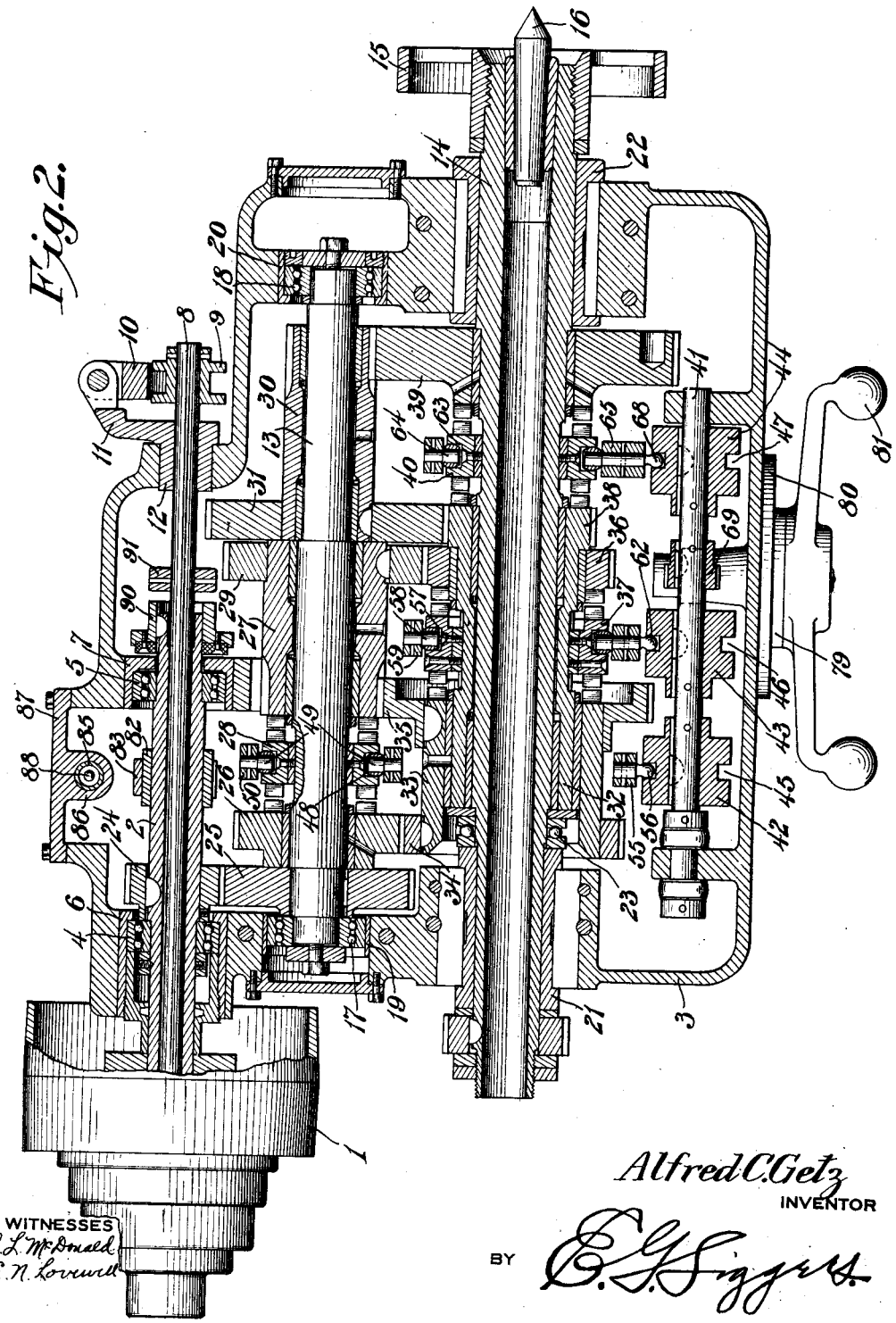
Figure 2 is a central horizontal section through the head stock.
Figure 3:
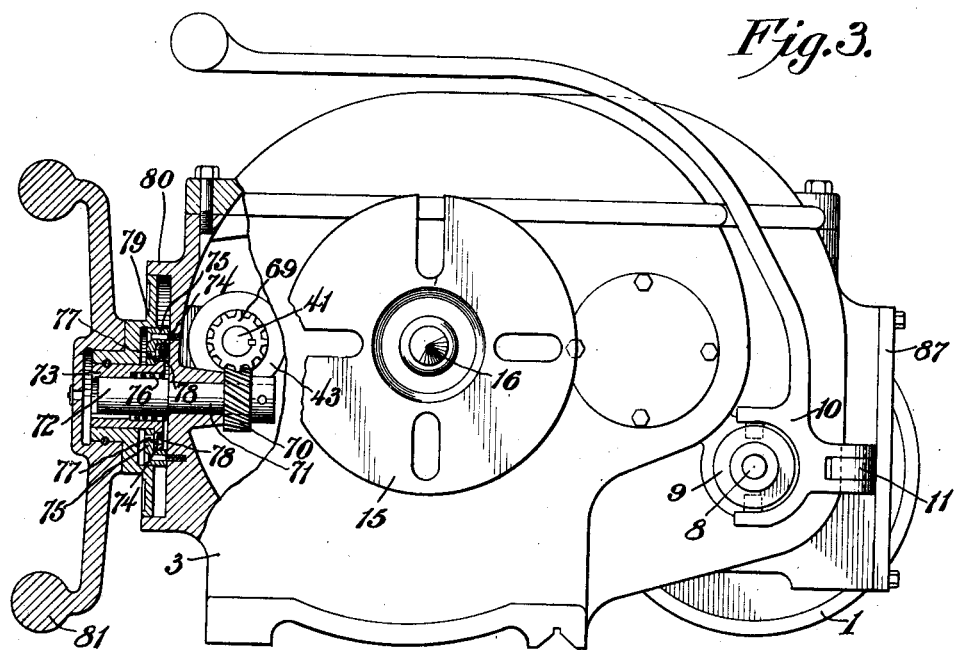
Figure 3 is an elevation of the head stock as viewed from the inner end, a portion of the selecting mechanism being shown in section.
Figure 6:
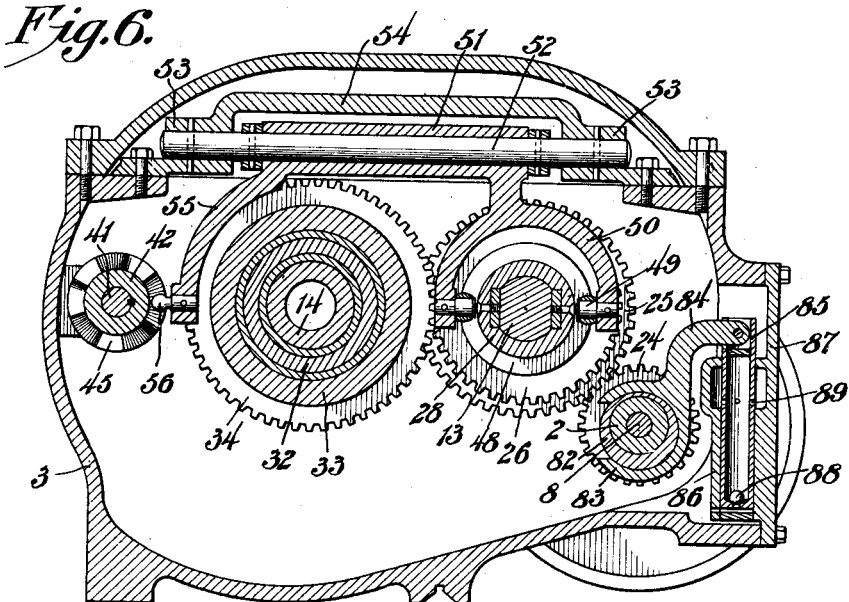
Figure 6 is a vertical section taken on the line 6—6 of Figure 1.
Figures 13, 14:
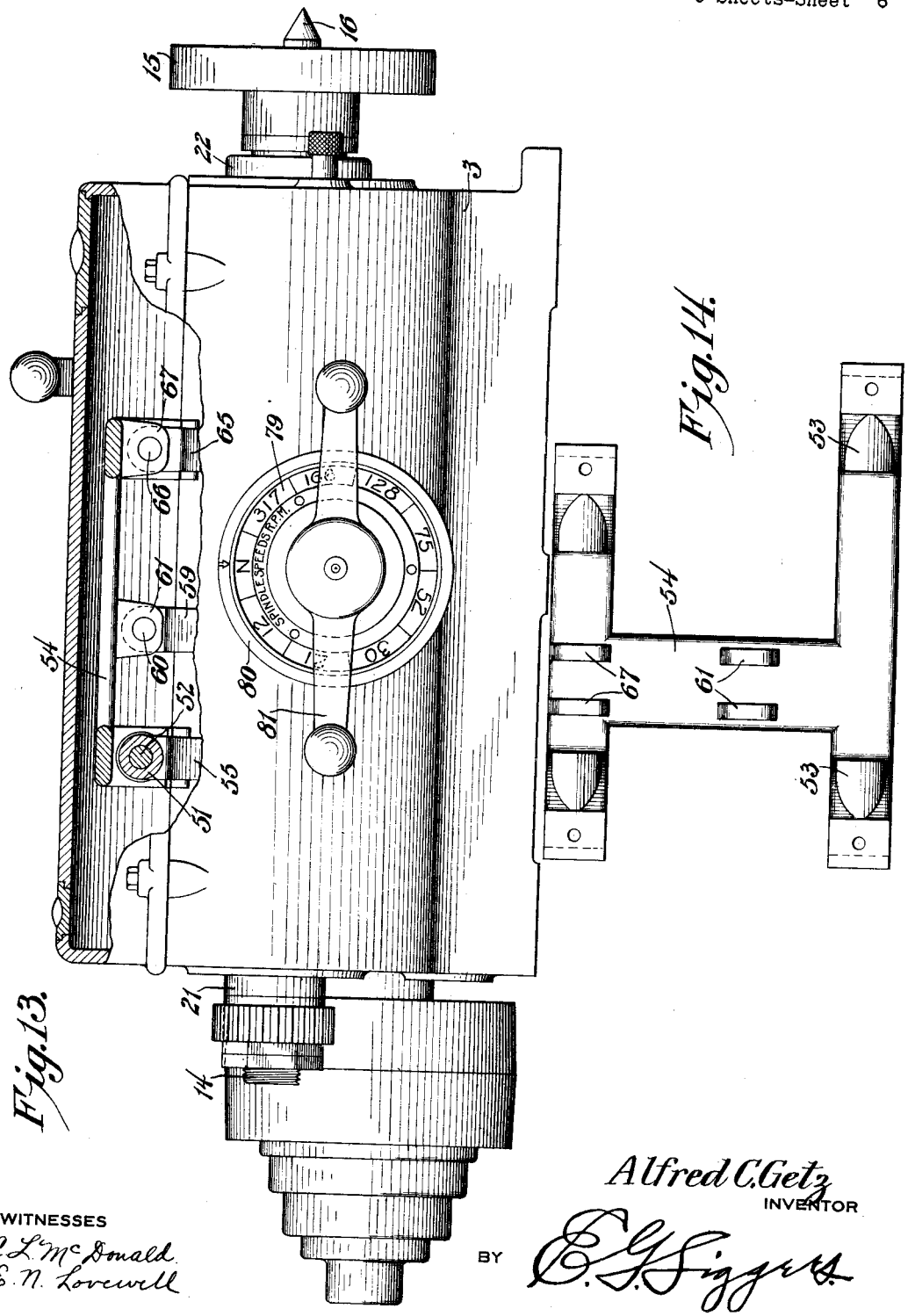
Figure 13 is a front elevation of the head stock, with the upper part shown in section.
Figure 14 is a bottom plan view of a bracket in which the clutch shifting yokes are mounted.

As shown in Figures 1, 2 and 6, an eccentric 82 may be secured for rotation with the drive shaft 2 in order to actuate mechanism for permitting the circulation of oil through the various parts of the housing. This mechanism includes a bearing 83, supported on the eccentric 82, and having an arm 84 pivotally connected to a plunger 85, which is mounted for reciprocation in a sleeve 86 formed on a plate 87, which constitutes part of the housing. This plunger is hollow, and has at its bottom an inlet port covered by a ball check valve 88. The plunger is provided with outlet ports 89 through which the oil is expelled into the chamber shown in Figure 6, and through which it may be carried to any part of the housing.

It is desirable to apply a brake to the gear mechanism to stop the rotation of the spindle when the control rod 8 is shifted to throw out the clutch connecting the pulley 1 to the drive shaft 20. Such a brake is shown at 90 in Figures 1 and 2, and is keyed to the drive shaft 2. A collar 91, secured to the clutch control rod 8, engages the brake 90 when the rod 8 is moved to throw out the clutch, and the brake is thus forced against the stationary bearing sleeve 7, and acts to retard the rotation of the drive shaft 2.

In Figures 10, 11 and 12, line $n$ represents neutral position. In other words, when the cam shaft 41 with the cams 42, 43 and 44 has been rotated until the pins 56, 62 and 68, following respectively the grooves 45, 46 and 47, are on the line $n$, the clutches 28, 37 and 40 will all be in the neutral position shown in Figure 2, and there will be no driving connection between the shaft 13 and the spindle 14. The lines $a$, $b$, $c$, $d$, $e$, $f$, $g$ and $h$ represent the different positions corresponding to the eight different speed ratios, which it is possible to establish between the shaft 13 and spindle 14.

In setting the gearing for the first or lowest speed, the cam shaft 41 is rotated until the pins 56, 62 and 68 are on the line $a$. In this position, the pin 56 and the clutch 28 will have been moved to the right from the position shown in Figure 2, and the clutch 28 will engage the sleeve 27. The pin 62 and the clutch 37 will have been moved to the left from the position shown in Figure 2, and the clutch 37 will engage the hub 33. The pin 68 and the clutch 40 will have been moved to the right from the position shown in Figure 2, and the clutch 40 will engage the gear 39. The shaft 13 is always geared to the drive shaft 2 through the gears 24 and 25. For the first or lowest speed then, the spindle 14 will be driven from the shaft 13 through the clutch 28, sleeve 27, gear 35, hub 33, clutch 37, sleeve 32, gear 38, gear 31, sleeve 30, gear 39 and clutch 40. In the practical application of the invention to an engine lathe, the speed of the motor and the ratio of the various gears is such that the spindle will be rotated at an approximate speed of 12 revolutions per minute.

In obtaining the second speed, the cam shaft 41 will be rotated so that the pins 56, 62 and 68 will be on the line $b$. The clutch 28 will then have been moved to the left into engagement with the gear 26, while the clutch 37 remains at the left, and the clutch 40 remains at the right. The drive will then be from the shaft 13, through the clutch 28, gear 26, gear 34, hub 33, and thence to the spindle 14 through the same train of gearing as in the first speed. In the practical application of the invention, this will drive the spindle 14 at an approximate speed of 21 revolutions per minute.

In obtaining the third speed, the pins 56, 62 and 68 are set on the line $c$. The pin 56 will then be at the right, the pin 62 at the right, and the pin 68 at the right. The clutch 28 will then engage the sleeve 27, the clutch 37 will engage the gear 36, and the clutch 40 will engage the gear 39. The drive will then be from the shaft 13 through clutch 28, sleeve 27, gear 29, gear 36, clutch 37, sleeve 32, and thence to the spindle 14 through the same train of gearing as in the first and second speeds. In the practical application of the invention, this will drive the spindle at an approximate speed of 30 revolutions per minute.

For obtaining the fourth speed, the cam shaft 41 is rotated until the pins 56, 62 and 68 are on the line $d$. The pin 56 will then be at the left, with the clutch 28 engaging the gear 26. The pin 62 will be at the right with the clutch 37 engaging the gear 36, and the pin 68 will be at the right with the clutch 40 engaging the gear 39. The drive will then be from the shaft 13, through clutch 28, gear 26, gear 34, hub 33, gear 35, sleeve 27, gear 29, gear 36, clutch 37, sleeve 32, gear 38, and thence to the spindle 14 through the same train of gearing as in the third speed. In the practical application of the invention, this will drive the spindle at an approximate speed of 52 revolutions per minute.

For obtaining the fifth speed, the cam shaft 41 will be rotated until the pins 56, 62 and 68 are on the line $e$. The pin 56 will then be at the right with the clutch 28 engaging the sleeve 27, the pin 62 will be at the left with the clutch 37 engaging the hub 33, and the pin 68 will be at the left with the clutch 40 engaging the sleeve 38. The drive will then be from the shaft 13, through clutch 29, sleeve 27, gear 35, hub 33, clutch 37, sleeve 32, gear 38, and directly through clutch 40 to the spindle 14. In the practical application of the invention, this will drive the spindle at an approximate speed of 75 revolutions per minute.

In obtaining the sixth speed, the cam shaft 41 will be rotated until the pins 56, 62 and 68 are on the line $f$. All three of the pins, and all three of the clutches 28, 37 and 40 will then be at the left. The drive will then be from the shaft 13, through clutch 29, gear 26, gear 34, hub 33, clutch 37, sleeve 32, gear 38, and thence directly through clutch 40 to the spindle. In the practical application of the invention, this will drive the spindle at an approximate speed of 128 revolutions per minute.

In obtaining the seventh speed, the cam shaft 41 will be rotated until the pins 56, 62 and 68 are on the line $g$. The pin 56 will then be at the right with the clutch 28 engaging the sleeve 27. The pin 62 will be at the right with the clutch 37 engaging the gear 36, and the pin 68 will be at the left with the clutch 40 engaging the sleeve 32. The drive will then be from the shaft 13 through clutch 28, sleeve 27, gear 29, gear 36, clutch 37, sleeve 32, and thence directly through clutch 40 to the spindle. In the practical application of the invention, this will drive the spindle at an approximate speed of 166 revolutions per minute.

To obtain the eighth speed, the cam shaft 41 is rotated until the pins 56, 62 and 68 are on the line $h$. The pin 56 will then be at the left with the clutch 28 engaging the gear 26. The pin 62 will be at the right with the clutch 37 engaging the gear 36, and the pin 68 will be at the left with the clutch 40 engaging the gear 38. The drive will then be from the shaft 13 through clutch 28, gear 26, gear 34, hub 33, gear 35, sleeve 27, gear 29, gear 36, clutch 37, sleeve 32, gear 38, and thence directly through clutch 40 to the spindle. In the practical application of the invention, this will drive the spindle at an approximate speed of 317 revolutions per minute.

It will be seen that, in the present example, eight different speed ratios may be obtained between the shaft 13 and spindle 14, by means of a combination of clutches, sleeves and gears, all of which are mounted either on the shaft 13 or the spindle 14. The only shifting parts are the clutches 28, 37 and 40, all of which are selectively shifted by the rotation of the cam shaft 41, through the medium of a single control lever 81. Moreover, the control lever or element is operated without shifting the main driving clutch and may be turned in either direction from any speed position or neutral to any other speed position or neutral, thus quickly changing speeds. Hence, the lever can always be shifted through the shortest arc or path to the desired position thereby effecting a great saving in time.

While the present embodiment of the invention has provision for eight speeds, it will be understood that the number of speeds may be varied without departing from the spirit of the invention.

Obviously, the present invention is not restricted to the particular embodiment thereof herein shown and described. Moreover, it is not indispensable that all the features of the invention be used conjointly, since they may be employed advantageously in various combinations and sub-combinations.

What is claimed is:

1. In a gear mechanism, the combination of a shaft, a double-faced clutch slidably keyed to said shaft, a gear journaled on said shaft at one side of the clutch, a sleeve journaled on said shaft at the other side of the clutch, said clutch being shiftable into engagement with either the gear or the sleeve, an intermediate driven member parallel to said shaft, a second double-faced clutch keyed to said intermediate driven member, a hub journaled on said intermediate driven member at one side of the second clutch and permanently geared to both the gear and the sleeve on said shaft, a gear journaled on the intermediate driven member and independently geared to said sleeve, said second clutch being shiftable into engagement with the hub or gear adjacent thereto, a second shaft, a gear journaled on the second shaft, a train of gearing connecting the gearing on the second shaft with said intermediate driven member, a third double-faced clutch slidably keyed to the second shaft and selectively shiftable in one direction into operative relation to said gear on the second shaft and in the other direction into more direct operative relation to the intermediate driven member, and means for simultaneously shifting any desired selection of clutches in one direction and the remaining clutches, if any, in the opposite direction.

2. In a gear mechanism, the combination of two parallel shafts, a double-faced clutch slidably keyed to the first shaft, a gear journaled on the first shaft at one side of the clutch, a sleeve journaled on the first shaft at the other side of the clutch, said clutch being shiftable from neutral position into engagement with either the gear or the sleeve, a sleeve journaled on the second shaft, a second double-faced clutch slidably keyed to the sleeve on the second shaft, a hub journaled on the last-mentioned sleeve at one side of the second clutch and permanently geared to both the gear and the sleeve on the first shaft, a gear journaled on the sleeve on the second shaft and independently geared to the sleeve on the first shaft, said second clutch being shiftable into engagement with the hub or gear adjacent thereto, a gear journaled on the second shaft, a third double-faced clutch slidably keyed to the second shaft between the last-mentioned gear and the sleeve on the second shaft, a train of gearing connecting the gear on the second shaft with the sleeve on the second shaft, said third clutch being shiftable in one direction into operative relation to the gear on the second shaft and in the other direction into direct engagement with the sleeve on the second shaft, and means for simultaneously shifting any desired selection of clutches in one direction, and the remaining clutches, if any, in the opposite direction.

3. In a gear mechanism, the combination of a shaft, a double-faced clutch keyed to said shaft, a gear journaled on said shaft at one side of the clutch, a sleeve journaled on said shaft at the other side of the clutch, said clutch being shiftable into engagement with either the gear or the sleeve, a driven member parallel to said shaft, a second double-faced clutch slidably keyed to said driven member, a hub journaled on said driven member at one side of the second clutch and permanently geared to both the gear and the sleeve on said shaft, a gear journaled on the driven member at the other side of said clutch and independently geared to the sleeve on the shaft, said second clutch being shiftable into engagement with the hub or gear adjacent thereto, and means for selectively shifting the first clutch in either direction and at the same time selectively shifting the second clutch in the same or in the opposite direction.

4. In a gear mechanism, the combination of two parallel shafts, a double-faced clutch keyed to the first shaft, a gear journaled on the first shaft at one side of the clutch, a sleeve journaled on the first shaft at the other side of the clutch, said clutch being shiftable from neutral position into engagement with either the gear or the sleeve, a sleeve journaled on the second shaft, a second double-faced clutch slidably keyed to the sleeve on the second shaft, a hub journaled on the first-mentioned sleeve at one side of the second clutch and permanently geared to both the gear and the sleeve on the first shaft, a gear journaled on the sleeve of the second shaft and independently geared to the sleeve on the first shaft, said second clutch being shiftable in one direction into engagement with said hub or in the other direction into engagement with the last mentioned gear, and means for selectively shifting the first clutch in either direction and at the same time selectively shifting the second clutch in the same or in the opposite direction.

5. In a gear mechanism, the combination of a rotatable shaft, a rotatable spindle parallel thereto, a double-faced clutch slidably keyed to the shaft, a single gear journaled on the shaft at one side of said clutch, two sets of gear teeth of different diameters rotatably mounted on the shaft at the other side of said clutch and rigidly connected together, said clutch being shiftable in one direction to lock said gear to the shaft and shiftable in the other direction to lock the two sets of gear teeth to the shaft, a sleeve journaled on the spindle, a second double-faced clutch slidably keyed to said sleeve, a hub journaled on said sleeve at one side of the second clutch, two sets of gear teeth rigidly connected with said hub and in constant mesh respectively with said single gear and with one of said two sets of gear teeth journaled on the shaft, a single gear journaled at the other side of said second clutch and in constant mesh with the other of said two sets of gear teeth on said shaft, said second clutch being shiftable in one direction to lock said hub to the sleeve on the spindle and shiftable in the other direction to lock the single gear thereto, means for selectively shifting the first clutch in either direction and at the same time selectively shifting the second clutch in the same or in the opposite direction, and means selectively operable to cause the spindle to rotate at the same speed as the sleeve on the spindle or at a different speed.

6. In a gear mechanism, the combination of a rotatable shaft, a rotatable spindle parallel thereto, a double-faced clutch slidably keyed to the shaft, a single gear journaled on the shaft at one side of said clutch, two sets of gear teeth of different diameters rotatably mounted on the shaft at the other side of said clutch and rigidly connected together, said clutch being shiftable in one direction to lock said gear to the shaft and shiftable in the other direction to lock the two sets of gear teeth to the shaft, a sleeve journaled on the spindle, a second double-faced clutch slidably keyed to said sleeve, a hub journaled on said sleeve at one side of the second clutch, two sets of gear teeth rigidly connected with said hub and in constant mesh respectively with said single gear and with one of said two sets of gear teeth journaled on the shaft, a single gear journaled at the other side of said second clutch and in constant mesh with the other of said two sets of gear teeth on said shaft, said second clutch being shiftable in one direction to lock said hub to the sleeve on the spindle and shiftable in the other direction to lock the single gear thereto, a gear journaled on the spindle, a third clutch slidably keyed to the spindle between the gear and the sleeve, gearing journaled on said shaft and connecting the gear on the spindle to the sleeve on the spindle, said third clutch being shiftable in one direction from neutral position to lock the sleeve directly to the spindle and in the other direction to lock the gear to the spindle, and means for simultaneously shifting any desired selection of clutches in one direction and the remaining clutches, if any, in the opposite direction.

7. In a gear mechanism, the combination of two parallel shafts, a sleeve journaled on one side of said shafts, a double-faced clutch slidably keyed to said sleeve, a double-faced clutch slidably keyed to each shaft, a separate yoke engaging each clutch and rockable to shift the same, a rotatably adjustable cam shaft having three cams thereon corresponding to the respective clutch yokes, each cam having a circumferential groove and a finger connected with the corresponding clutch yoke and engaging the groove, said grooves having inclined portions relatively arranged in such a sequence that by proper adjustment of the cam shaft any desired selection of clutches may be moved in one direction while the remaining clutch or clutches, if any, are moved in the opposite direction, gear elements rotatably mounted one on each side of each clutch, and means cooperating with said gear elements to establish a different driving train between one of said shafts and the other for each different combination in the selected displacement of the clutches from neutral position.

8. In a geared head lathe, a drive shaft and intermediate shaft parallel with the lathe spindle; gears connecting the drive shaft and intermediate shaft; a series of change speed gears on the intermediate shaft and the lathe spindle; clutches co-operating with some of said gears arranged to effect the various speed changes; a spider removably secured to the lathe head below the top wall; clutch operating yokes suspended from said spider; and a single clutch control element operatively connected to all of said yokes.

9. In a geared head lathe, a drive shaft and intermediate shaft parallel with the lathe spindle; gears connecting the drive shaft and intermediate shaft; a series of change speed gears on the intermediate shaft and the lathe spindle; clutches co-operating with some of said gears arranged to effect the various speed changes a cover on the head; a spider above all of said gears and below said cover; clutch operating members suspended from the spider; and clutch control means operatively connected to all of said members.

10. In a geared head lathe, a drive shaft and intermediate shaft parallel with the lathe spindle; gears connecting the drive shaft and intermediate shaft; a series of change speed gears on the intermediate shaft and the lathe spindle; clutches co-operating with some of said gears arranged to effect the various speed changes; a spider removably secured to the head above all of the gears and below the top wall; clutch yokes pivotally suspended from the spider and removable therewith; and a single clutch control lever operatively connected to all of said yokes.

11. In a geared head lathe, a drive shaft and intermediate shaft parallel with the lathe spindle; gears connecting the drive shaft and intermediate shaft; a series of change speed gears on the intermediate shaft and the lathe spindle; clutches co-operating with some of said gears arranged to effect the various speed changes; a spider within the head above said gears and removably mounted in the head; clutch yokes pivotally suspended from the spider; lateral arms on the yokes extending toward the front face of the head; and a single control lever operatively connected to all of said arms successively to shift the clutches.

12. In a geared head lathe, a drive shaft and an intermediate shaft parallel with the spindle; a driving connection between the drive shaft and the intermediate shaft; change speed gears on the intermediate shaft and the spindle; a plurality of clutches on said intermediate shaft and spindle; clutch operating yokes for all of the clutches suspended within said head and mounted to be removed as a unit independently of the parts of said head to afford access to said gearing; and a single control lever operatively connected to all of said yokes.

13. In a geared head lathe, a drive shaft and an intermediate shaft parallel with the spindle; a double faced positive clutch keyed to said intermediate shaft; a gear journaled on said shaft at one side of the clutch; a sleeve journaled on said shaft at the other side of the clutch; said clutch being shiftable into engagement with either the gear or the sleeve; a sleeve on the spindle a second double-faced clutch slidably keyed on the spindle sleeve; a hub journaled on the spindle sleeve at one side of the second clutch and permanently geared to both the gear and the sleeve on said intermediate shaft; a gear journaled on the spindle sleeve at the other side of said second clutch and independently geared to the sleeve on the intermediate shaft, said second clutch being shiftable into engagement with the adjacent hub or with the gear; back gearing on the spindle sleeve, spindle and intermediate shaft; a clutch on the spindle directly to connect the spindle sleeve to the spindle or to connect the spindle sleeve to the spindle through the back gearing; and single means for selectively shifting all of said clutches whereby to change the speed of the spindle.

In testimony, that I claim the foregoing as my own, I have hereto affixed my signature.

ALFRED C. GETZ.